United States Patent Office 3,637,881
Patented Jan. 25, 1972

3,637,881
ALKYLAROMATIC ISOMERIZATION PROCESS
Archibald H. Williams, Justice, Dalia Germanas, Des Plaines, and George R. Donaldson, Barrington, Ill., assignors to Universal Oil Products Company, Des Plaines, Ill.
No Drawing. Filed Sept. 25, 1968, Ser. No. 762,634
Int. Cl. C07c 5/24
U.S. Cl. 260—668 A                    9 Claims

ABSTRACT OF THE DISCLOSURE

Transalkylation of alkylaromatics, occurring during the isomerization of such alkylaromatics, is suppressed by the addition of a basic nitrogen compound to the isomerization reaction. The process is especially adaptable to the isomerization of $C_8$ aromatics.

BACKGROUND OF THE INVENTION

This invention relates to the catalytic isomerization of isomerizable alkylaromatics. More specifically, it is concerned with minimizing the transalkylation reactions occurring during the isomerization of alkylaromatics, and, in particular, suppressing the formation of $C_9+$ and $C_7-$ aromatics during the isomerization of a $C_8$ aromatic feedstock.

The term transalkylation, as used herein, refers to the transfer of one or more alkyl groups, or a portion of an alkyl group from its original aromatic nucleus to another aromatic nucleus. This differs from the isomerization reaction where the transfer occurs from one position within the original aromatic nucleus to another position within the same nucleus. As a result of the transalkylation reaction, the original aromatic nucleus contains less carbon atoms and another aromatic nucleus contains more carbon atoms. For example, in the isomerization of a mixture of the $C_8$ aromatic isomers, namely ethylbenzene and the xylenes, a methyl group from one xylene molecule could transfer and transalkylate with another xylene molecule forming a tri-methyl benzene or a methylethylbenzene, or the methyl group could transfer to an ethylbenzene molecule forming a methylethylbenzene or a propylbenzene. In both cases, the original xylene molecule would be reduced to toluene by a single methyl group transfer or to benzene by a double methyl group transfer. In a like manner, a methyl group or the entire ethyl group could transfer from an ethylbenzene molecule to another ethylbenzene molecule or a xylene molecule, rendering a new $C_9$ or $C_{10}$ aromatic molecule and converting the ethylbenzene to toluene or benzene. This reaction is also known to those trained in the art as disproportionation or methyl-group transfer.

In recent years, the demand for alkyl benzenes such as the xylene isomers and ethylbenzene has exceeded the natural occurring supply of these compounds, especially that of para-xylene. This demand for para-xylene which is utilized as an intermediate for synthetic fabrics and polyesters fibers has led to the development of processes for the preferential conversion of other hydrocarbons to para-xylene.

Currently para-xylene is produced mainly by the isomerization of the isomeric $C_8$ aromatic hydrocarbons, namely ortho-xylene, meta-xylene and ethylbenzene, into the para-xylene isomer. This isomerization reaction is conducted by contacting the isomerizable $C_8$ aromatic hydrocarbons in admixture with, or in the absence of hydrogen with an isomerization catalyst at isomerization conditions. Typical of such isomerization catalysts are the Friedel-Crafts type, the acid treated clays or synthetic materials composed largely of silica in combination with alumina, magnesia, thoria, zironia or boria, and crystalline aluminosilicates used alone or in conjunction with alumina. In addition, these catalysts also function as supports for a hydrogenating component such as a Group VIII metal to produce superior isomerization catalysts. A perusal of the prior art indicates isomerization conditions generally include temperatures of about 0° C.–600° C., and pressures of about atmospheric to 100 atmospheres. Usually hydrogen is present in the reaction zone at a hydrogen to hydrocarbon mole ratio of about 2:1 to about 20:1 to maintain catalyst activity. However, the isomerization of $C_8$ aromatic hydrocarbons to form para-xylene at the foregoing conditions is accompanied simultaneously by the transalkylation of the $C_8$ aromatic hydrocarbons resulting in the formation of $C_7-$ and $C_9+$ aromatics. As a result of the formation of these $C_9+$ and $C_7-$ alkyl-aromatics, there is a lower overall yield of para-xylene and increased consumption of the other isomers. In the past, this transalkylation reaction was suppressed by lowering the reactor temperature but this resulted in an isomerization activity decline with attendant yield losses. This results in larger reactors in order to maintain a specified production slate, as well as expanded recovery sections.

SUMMARY OF THE INVENTION

Accordingly, it is an object of this invention to provide an improvement in existing alkylaromatic hydrocarbon isomerization processes as well as providing a new alkylaromatic hydrocarbon isomerization process. More specifically, it is an object of this invention to provide a means for controlling and inhibiting the transalkylation of alkylaromatics during an isomerization reaction without lowering the reactor temperature and lessening the overall isomer yield, especially the yield of para-xylene.

In an embodiment, our invention provides an improvement in a process for isomerizing alkylaromatic hydrocarbons, in contact with an isomerization catalyst and at isomerizing conditions selected to produce isomers of said hydrocarbon, in which process transalkylation products of said hydrocarbon are formed, the improvement which comprises contacting said hydrocarbon, in admixture with a basic nitrogen compound, with said catalyst and at said conditions, whereby the formation of transalkylation products is suppressed.

In a more limited embodiment, our invention provides a process for isomerizing an isomerizable alkylaromatic hydrocarbon which comprises contacting said hydrocarbon, in admixture with hydrogen and a basic nitrogen compound, with a catalyst containing a Group VII metal component combined with a refractory inorganic oxide at isomerization conditions, said nitrogen compound controlling the degree of transalkylation associated with the isomerization reaction.

In a more specific embodiment, the aforementioned refractory inorganic oxide preferably consists of a crystalline aluminosilicate, either by itself, or in conjunction with alumina, and said isomerization conditions include a temperature of about 0° C.–600° C., preferably about 300° C.–500° C., a pressure of about atmospheric to 100 atmospheres and a hydrogen to hydrocarbon mole ratio of about 2:1 to about 20:1.

In summary, a principal advantage of our invention resides in the isomerization of isomerizable alkylaromatic hydrocarbons, at conditions conducive to isomerization, with the deleterious transalkylation side reactions being suppressed. This results in increased yields of the desired isomer.

In a broad aspect, our invention relates to the addition of a basic nitrogen compound, as a transalkylation suppressor, to catalytic alkylaromatic isomerization processes to minimize the transalkylation of the alkylaromatics and maximize the isomer yield. In effect, the amount of transalkylation can be substantially independently regulated by the addition of said basic transalkylation suppressor to the isomerization reaction zone without affecting the isomerization reaction promoted by the catalyst.

DESCRIPTION OF THE PREFERRED EMBODIMENTS

The alkylaromatic hydrocarbon stocks, applicable as isomerizable alkylaromatic hydrocarbons within our process, include those aromatics having more than seven carbon atoms per molecule such as ortho, meta and paraxylene, ethylbenzene, ortho, meta and para-ethyltoluene, the trimethyl benzenes, the diethylbenzenes, the triethylbenzenes, the propylbenzenes, etc. and mixtures thereof. Higher molecular weight alkylaromatic hydrocarbons such as detergent intermediates formed by alkylation of aromatic with olefins are also included. Typical of such materials are the hexylbenzenes, nonylbenzenes, dodecylbenzenes, hexyltoluenes, etc. Examples of other alkylaromatic hydrocarbons applicable are those containing condensed aromatic rings such as the alkyl naphthalenes, the alkyl anthracenes, etc. and the alkyl aromatic hydrocarbons with two or more aryl groups such as the alkyl substituted diphenyls and triphenyls, the alkyl substituted fluorenes, the alkyl substituted stilbenes, etc. These alkylaromatic hydrocarbons may be derived from various naturally occurring petroleum streams or coal tar fractions by selective fractionation of the individual components or as a certain boiling range fraction and may be isomerized individually, in mixture with the other isomers and alkyl aromatics, or in presence of a diluent such as hydrogen, nitrogen, methane, ethane, propane, etc.

While our invention is described and illustrated by the isomerization of a $C_8$ aromatic hydrocarbon, either as a single isomer and/or as a mixture of isomers, with $C_8$ aromatic hydrocarbons being the preferred feed stock for our process, this invention is also generally applicable to higher alkyl benzenes as previously described.

The preferred isomerization catalysts employed in our process comprise those catalysts containing at least one refractory oxide and a metal selected from Group VIII of the Periodic Table, namely, iron, cobalt, nickel, ruthenium, rhodium, palladium, osmium, iridium and platinum, in particular those having a molecular weight greater than 100 and known as the Noble Metals, namely ruthenium, rhodium, palladium, osmium, iridium and platinum, or a metal selected from Group VI–B, namely chromium; molybdenum and tungsten (wolfram) which are capable of isomerizing isomerizable alkylaromatic hydrocarbons in admixture with hydrogen. A preferred type of catalyst that falls within this category are those catalysts comprised of a Group VIII noble metal, in particular platinum or palladium, combined with a solid support of alumina and a finely divided crystalline aluminosilicate. In many instances, the catalytic composite contains a combined halogen, especially combined fluorine and combined chloride. There are numerous types of crystalline aluminosilicates both synthetic and natural, containing $SiO_4$ and $AlO_4$ tetrahedra. The silicon or aluminum atom are centered around four oxygen atoms in the tetrahedra, and the oxygens are shared with surrounding tetrahedra geometrically arranged to form a pore structure large enough to permit the reactant molecules to pass through. Preferably, the aluminosilicates employed have pore mouths of between 5 and 15 angstroms in cross sectional diameter and are the hydrogen and/or polyvalent form of faujasite and mordenite. The aluminosilicates are treated to improve their catalytic activity by techniques such as ion exchange with suitable cations and thermal treatment. Customarily, the aluminosilicates are prepared in the alkali metal form with one monovalent alkali metal cation associated with each aluminum centered tetrahedra. These aluminosilicates may be ion exchanged with polyvalent cations such as calcium, magnesium, beryllium, rare earths, etc. to replace a substantial amount of the monovalent alkali cations. This forces one polyvalent cation to be associated with more than one aluminum centered tetrahedra. If those tetrahedra are spread sufficiently far apart by the silicon centered tetrahedra, areas of local electric charge will form, thereby aiding the promotion of catalytic reactions. The catalytic activity of aluminosilicates may also be improved by conversion to the hydrogen form through ion-exchange with ammonium ions followed by thermal treatment, preferably above 300° C. or by direct contact with dilute acid solutions. These catalysts can be prepared by commingling a calcined or uncalcined crystalline aluminosilicate in a finely divided state with an alumina sol, gelling the mixture, followed by calcination and the incorporation of a Group VIII metal, and in some instances chlorine or fluorine. In addition, these catalysts may be reduced and sulfided by methods well known to the art.

Other groups of catalysts that can be used in the present process are those catalysts comprised of an active ingredient selected from the group consisting of silica and the crystalline aluminosilicates used alone or in conjunction with a member selected from the group consisting of alumina, zirconia, magnesia, thoria and boria. These catalysts may also incorporate a metallic catalytic component selected from the Group VIII or VI–B metals.

The process of our invention, utilizing the catalysts hereinbefore set out, may be effected in any suitable manner familiar to those trained in the art including batch or continuous operations. Continuous operations such as a fixed bed, fluidized-fixed bed, moving bed, suspensoid and slurry operations are preferred because of ease in operation. However, we especially prefer the use of fixed-bed type processes since they minimize attrition losses of the relatively expensive catalysts and entail the fewest operating problems. One fixed-bed method of utilizing our process comprises preheating the isomerizable alkylaromatic hydrocarbons in admixture with hydrogen and a basic nitrogen compound to isomerizing temperatures and charging this mixture continuously to a fixed-bed reaction zone containing the desired catalyst maintained at the proper isomerizing conditions. This reaction charge passes through the catalyst bed in either upflow or downflow with the isomerized product being continuously withdrawn and recovered. If so desired, any unreacted starting materials may be recycled and combined with fresh reactor feed. Proper isomerization conditions include temperatures in the range of about 0° C.–600° C., pressures in the range of about atmospheric to 100 atmospheres, hydrogen to hydrocarbon mole ratios of about 2:1–20:1 and liquid hourly space velocities defined as volume of hydrocarbons charged per hour per volume of catalyst within the reaction zone of about 1–40 hr.$^{-1}$.

The basic nitrogen transalkylation suppressors comprise those compounds that exhibit basic properties under the conditions prevailing in the isomerization zone. One preferred group of transalkylation suppressors that can be used in our process comprises the halogen-free, nitrogen-containing compounds which are convertible to ammonia at conditions prevailing in the isomerization zone. These compounds include ammonia itself; primary, secondary, and tertiary aliphatic and aryl amines such as tertiarybutyl amine and aniline; quaternary ammonium compounds; hydrazine; heterocyclic organic nitrogen compounds such as pyrrole and pyridine; and the aromatic bicyclic systems such as indole, quinoline and purine. Halogen-free compounds are preferred since halogen or hydrogen halide formed within the reaction zone could add to the halogen present on the catalyst for isomerization promotion and induce transalkylation, offsetting the gain to be attained by basic addition. In effect, some halogen may be desirable as a catalytic promoter of isomerization but larger amounts induced transalkylation as well as isomerization.

The amount of basic nitrogen transalkylation suppressor required to effectively suppress transalkylation depends on the reaction conditions as well as the particular catalyst being used. A relatively simple method of determining the correct amount of suppressor to be added is to observe the composition of the isomerization reactor effluent particularly the amount of aromatics present in the effluent that are heavier and/or lighter than the reactor feedstock. For example, in the isomerization of a $C_8$ alkyl aromatic, the increase in production of toluene, benzene and $C_9+$ aromatics is an indication of the degree of transalkylation occurring within the reactor zone. Generally, the amount of basic nitrogen compound required to be added to suppress transalkylation during an isomerization process will be from about 0.1 part per million to 200 parts per million by weight nitrogen based on the weight of charge entering the reaction zone. Since the nitrogen concentration is expressed in the elemental form, it is necessary to determine the weight of nitrogen present in the nitrogen compound being added to the reaction zone to determine the correct amount of nitrogen compound to add. This basic nitrogen transalkylation suppressor can be added in the required amounts to the charging stock or directly to the reaction zone.

From the foregoing, it can be seen that we have invented an improved process for the isomerization of isomerizable alkylaromatic hydrocarbons in the presence of isomerization catalysts, said process resulting in more complete isomerization of the alkylaromatic feedstock with minimal amounts of undesired transalkylation side reactions occurring. This more complete utilization of a given feedstock lowers feedstock consumption and produces a more uniform product.

The following examples are given in illustration of our invention, but it is to be understood that they are presented for purposes of illustration and not by way of limitation.

EXAMPLE I

A mixed $C_8$ alkylaromatic hydrocarbon stream consisting of 0.5 weight percent benzene, 23.8 weight percent ethylbenzene, 11.0 weight percent p-xylene, 55.9 weight percent m-xylene and 8.8 weight percent o-xylene, blended to simulate a crystallizer raffinate stream, was isomerized at 300 p.s.i.g., 800° F., 4.0 liquid hourly space velocity and a 8:1 hydrogen to hydrocarbon mole ratio in contact with a catalyst comprised of 0.75 weight percent palladium, 0.9 weight percent chlorine, and 0.1 weight percent sulfur combined with a base containing 5 weight percent mordenite, 4.4 weight percent silica and 91 weight percent alumina.

Presented in Table I are the weight percent yields obtained before and after the addition of 5 parts per million by weight nitrogen in the form of tertiary-butylamine, the amine being added immediately following Test 1.

As used within Table I, $K_x$ refers to the concentration of p-xylene as defined by the ratio of p-xylene to total xylenes in the reactor product. Reaction efficiency is defined as the percentage ratio of the difference between the weight percent ethylbenzene, ortho-xylene and meta-xylene in the feed and the product. This efficiency reflects the conversion of ethylbenzene, meta-xylene, and ortho-xylene to para-xylene versus transalkylation to benzene, toluene and $C_9+$ aromatics.

TABLE I

| Test | 1 | 2 | 3 | 4 |
|---|---|---|---|---|
| Catalyst age, barrels feed/lb. catalyst | 2.29 | 3.32 | 3.83 | 4.33 |
| Wt. percent yields | 2.29 | 3.32 | 3.83 | 4.33 |
| $C_5-$ | 1.22 | 0.49 | 0.53 | 0.48 |
| $H_2$ consumption | −.10 | −.08 | −.07 | −.03 |
| Non aromatics | 1.88 | 1.89 | 1.79 | 1.69 |
| Benzene | 2.37 | .90 | 0.90 | 0.80 |
| Toluene | 8.90 | 3.09 | 2.89 | 2.59 |
| Ethylbenzene | 15.33 | 20.81 | 20.80 | 20.70 |
| p-Xylene | 14.04 | 16.33 | 16.72 | 16.72 |
| m-Xylene | 31.54 | 37.74 | 37.53 | 38.33 |
| o-Xylene | 12.95 | 15.04 | 15.23 | 15.03 |
| Total $C_8$ aromatics | 73.86 | 89.92 | 90.28 | 90.79 |
| $C_9+$ aromatics | 11.87 | 3.79 | 3.68 | 3.68 |
| Total $C_9+$ and $C_7$ aromatics | 23.14 | 7.78 | 7.47 | 7.07 |
| Reaction efficiency: | | | | |
| Percent | 10.6 | 35.7 | 38.3 | 39.6 |
| $K_x$ | .240 | .237 | .241 | .239 |

As can readily be seen from the data presented in Table I, the addition of a basic nitrogen compound has greatly enhanced the isomerization process. Not only has the para-xylene yield been increased by a factor of over 18 percent, by the addition of the basic nitrogen compound on a once through operation, the amount of $C_7-$ and $C_9+$ transalkylation products produced within the isomerization reaction has been decreased by over 200 percent. This reflects over 20 percent more $C_8$ aromatics being available for isomerization to para-xylene on a recycle process thus further increasing the overall yield of para-xylene to be realized by our invention. Further, the reaction efficiency is increased almost by a factor of four, clearly indicating the transalkylation suppression induced by the addition of a basic nitrogen compound to an isomerization process.

We claim as our invention:

1. In a process for isomerizing an isomerizable alkyl aromatic hydrocarbon, in admixture with hydrogen and in contact with an isomerization catalyst comprising a Group VIII noble metal, alumina and a finely divided crystalline aluminosilicate and at isomerizing conditions selected to produce isomers of said hydrocarbon, in which process transalkylation products of said hydrocarbon are formed, the improvement which comprises contacting said hydrocarbon, in admixture with a basic nitrogen compound, with said catalyst and at said conditions, whereby the formation of transalkylation products is suppressed.

2. The process of claim 1 further characterized in that said isomerization conditions include a temperature of about 0° C. to about 600° C., a pressure of about atmospheric to about 100 atmospheres, a liquid hourly space velocity of about 1 to about 40, and a hydrogen to hydrocarbon mole ratio of about 2:1 to about 20:1.

3. The process of claim 1 further characterized in that said alkyl aromatic hydrocarbon is a $C_8$ aromatic hydrocarbon.

4. The process of claim 1 further characterized in that said basic nitrogen compound is present in an amount of about 0.1 to about 200 parts per million, by weight of said alkyl aromatic hydrocarbon, calculated as elemental nitrogen.

5. The process of claim 1 further characterized in that said basic nitrogen compound is an amine.

6. The process of claim 1 further characterized in that said basic nitrogen compound is ammonia.

7. The process of claim 1 further characterized in that said crystalline aluminosilicate is in the hydrogen form.

8. The process of claim 1 further characterized in that said crystalline aluminosilicate is mordenite and Group VIII metal is platinum in an amount of about 0.05% to about 5% by weight.

9. The process of claim 1 further characterized in that said crystalline aluminosilicate is mordenite and said Group VIII metal is palladium in an amount of about 0.5% to about 5% by weight.

References Cited

UNITED STATES PATENTS

| | | | |
|---|---|---|---|
| 3,293,314 | 12/1966 | Brodbeck | 260—668 |
| 3,370,099 | 2/1968 | Plank et al. | 260—668 |
| 3,442,794 | 5/1969 | Van Helden et al. | 260—668 |
| 3,363,017 | 1/1968 | Hepp et al. | 260—668 |
| 3,409,687 | 11/1968 | Wadley et al. | 260—668 |
| 3,449,456 | 6/1969 | Amir et al. | 260—668 |

CURTIS R. DAVIS, Primary Examiner